United States Patent [19]
Buning et al.

[11] 3,755,252
[45] Aug. 28, 1973

[54] CROSS-LINKED ARTICLES AND COATINGS OF VINYL CHLORIDE POLYMERS AND PROCESS FOR THEIR MANUFACTURE

[75] Inventors: Robert Buning, Troisdorf-Sieglar; Siegmund Frick, Troisdorf-Oberlar, both of Germany

[73] Assignee: Dynamit Novel Aktiengesellschaft, Troisdorf, Germany

[22] Filed: Sept. 13, 1971

[21] Appl. No.: 180,149

[30] Foreign Application Priority Data
Sept. 19, 1970 Germany.................. P 20 46 293.5

[52] U.S. Cl. 260/46.5 R, 204/159.13, 260/46.5 UA, 260/465 P, 260/87.5 R, 260/92.8 A, 260/827
[51] Int. Cl. ............................................ C08f 11/04
[58] Field of Search ................. 260/87.5 R, 92.8 A, 260/46.5 R, 46.5 U, 46.5 P

[56] References Cited
UNITED STATES PATENTS
3,423,376  1/1969  Gobran et al. ................. 260/87.5 R
3,554,989  1/1971  Stamm ........................... 260/92.8 A
3,629,214  12/1971  Buning et al. .................. 260/87.5 R
3,402,205  9/1968  Gregory ............................. 260/610
3,558,669  1/1971  Breslow ............................ 260/349

OTHER PUBLICATIONS

Bevington et al., Journal of the Chemical Society, Feb. 1949, pp. 482 to 485.

Primary Examiner—Donald E. Czaja
Assistant Examiner—M. I. Marquis
Attorney—Burgess, Clinklage & Sprung

[57] ABSTRACT

A process for cross-linking a vinyl chloride polymer which comprises mixing a non-cross-linked vinyl chloride-silane copolymer with an acid catalyst and heating, if necessary. The compositions produced by this process are useful as coatings, fibers or sheets.

9 Claims, No Drawings

CROSS-LINKED ARTICLES AND COATINGS OF VINYL CHLORIDE POLYMERS AND PROCESS FOR THEIR MANUFACTURE

BACKGROUND

The invention is directed to the problem of improving the manufacture of cross-linked manufactured goods and coatings of vinyl chloride polymers and of endowing such cross-linked products with superior qualities.

Molding compounds must be created which, after they have been formed, can be cross-linked by the selection of certain catalysts either at room temperature or at higher temperatures. Furthermore, it would be desirable to obtain cross-linked articles characterized by particular cross-linking densities. The distribution of the cross-links in the molecule should therefore be predeterminable, not random as it has been in the state of the art. In particular, it has hitherto been impossible to see to it that all of the molecules in the vinyl chloride polymers participate in the cross-linking process.

SUMMARY

These problems are solved by the process of the invention and by the cross-linked products or coatings manufactured thereby.

The subject of the invention is a process for the manufacture of cross-linked articles and coatings of vinyl chloride polymers, in which non-cross-linked copolymers of 30 to 99.9 weight percent vinyl chloride and 0.1 to 20 weight percent of a silane of the general formula

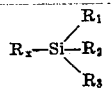

in which $R_x$ is a vinyl or allyl radical, $R_1$ represents an alkoxy radical of one to 18 carbon atoms, an aryloxy radical of six to 12 carbon atoms and an aralkoxy radical of 7 to 24 carbon atoms, and $R_2$ and $R_3$ have the same meaning as $R_1$, but at the same time can be alkyl radicals of one to 18 carbon atoms, aryl radicals of six to 12 carbon atoms and aralkyl radicals of seven to 24 carbon atoms, are uniformly mixed with an acid catalyst and heating if necessary for cross-linking.

DESCRIPTION

The non-cross-linked copolymers of vinyl chloride or vinyl or allyl alkoxy silanes used according to the invention can be made by suspension, precipitation or emulsion polymerization. The kind of copolymerization depends on the intended application and on the structure of the silanes. The important thing is that no cross-linked copolymers develop either during the copolymerization or even during storage. For certain applications, small amounts of cross-linked components cause no trouble. For the purposes of the invention, very suitable gel-free copolymers of vinyl chloride with vinyl trialkoxy silanes and, in certain cases, other comonomers which can be copolymerized with vinyl chloride, are obtained by polymerization in suspension or in solution with the use of percarbonates, if the formed copolymer is kept by known means in the fluid state. This is possible, for example, by using as the stirring means ribbon mixers, planetary stirrers or even balls in a rolling autoclave. The process of the manufacture of these gel-free copolymers is the subject of the German Patent application No. P 20 46 118.1 of September 18, 1970, now published as German Patent No. 2046118.

Examples of the vinyl or allyl alkoxy silanes which can be copolymerized with vinyl chloride in the stated quantities are vinyl triethoxy silane, vinyl tripropoxy silane, vinyl tributoxy silane, vinyl tri-tert.-butoxy silane, vinyl trimethoxy silane, vinyl trihexoxy silane, vinyl trinonoxy silane, allyl trimethoxy silane, allyl triethoxy silane, allyl tripropoxy silane, allyl tributoxy silane, allyl trimonoxy silane, etc.

Other monomers can be copolymerized with the vinyl chloride-silane copolymer. Examples of such monomers are vinyl esters, fumaric esters, maleic esters, itaconic esters, vinylidene chloride, acrylonitrile, methacrylonitrile, acrylates, vinyl fluoride, and olefins, especially ethylene or propylene. The syndiotactic copolymers prepared in the temperature range from $-80°$ to $+20°C$ are superior to the atactic copolymers prepared at higher temperatures as starting products for the manufacture of cross-linked PVC fibers which are completely insoluble in solvents and are characterized by high tensile strengths, especially at elevated temperatures. Furthermore, especially good results are obtained with vinyl chloride-silane copolymers which contain 30 to 99.5 weight percent vinyl chloride and 0.5 to 10 weight percent of a silane of the above-stated formula as comonomers.

The acid catalysts suitable for the purposes of the invention can be divided into two groups. Type I acid catalysts, especially the phosphoric acids and the sulfonic acids, and also hydrogen halide acids, especially hydrochloric acid, are effective even at room temperature.

Type II acid catalysts are especially suitable for cross-linking at elevated temperature, i.e., especially for temperatures from 100° to 180°C. These include carboxylic acids and boric acids, and a number of compounds which are essentially neutral, such as peroxides, azo compounds and azides, which probably exercise their catalytic action by cleaving hydrochloric acid from the polyvinyl chloride. Light or high-energy radiation produce a similar action. Hypophosphorous acid and aromatic sulfonic acids assume a preferred position as regards the catalytic activity of the catalysts of Type I which are active at room temperature.

For certain applications, it is advantageous to add the acid catalysts, i.e., the acids themselves or the acid-forming or acid-cleaving substances, during the copolymerization, whereby a uniform distribution in the copolymer is achieved. Suitable for this purpose are catalysts which are not active during the copolymerization and during storage after the copolymerization, and which require an increase in temperature, such as the above-enumerated acid catalysts of type II, as well as masked catalysts, such as coordination compounds, acid forming or cleaving compounds, such as lactones, esters, for example, boric acid esters, phosphoric acid esters, which are hydrolytically cleavable in acids.

A gel-free polymerization is a polymerization free of cross-linking and is performed without the addition of a solvent or diluent for the monomers or copolymer formed. This is a so-called mass or substance polymerization which can also be carried out in the presence of a water-free solvent. During the polymerization the polymer particles and the reactants are kept in a fluid state by means of a mixer or grinder.

A gel-free polymerization can be carried out in an aqueous medium or with traces of water using any suitable polymerization method. This is also required when the silane comonomer used is not hydrolyzable under the polymerization conditions.

The acid catalyst is used in quantities of 0.1 to 5 percent, and preferably 0.1 to 1 percent, of the weight of the copolymer. The mixing of the non-cross-linked copolymer with acid catalyst is best performed in the presence of a solvent or swelling agent. Suitable solvents are particularly ketones, especially cyclohexanone, and tetrahydrofuran. In cyclohexanone, the cross-linking reaction generally takes place more rapidly than in tetrahydrofuran. The cross-linking of solutions of the copolymers by the Type I catalysts which are active at room temperature evidences itself in a transformation of the fluid solution to a firm, jelly-like mass. At first mechanical vibrations, such as sound or shock, are absorbed by this jelly. This effect diminishes after a period of time. This peculiar behavior clearly shows how different is the construction of the PVC types cross-linked in accordance with the invention from the cross-linked PVC copolymers of the prior art. The cause is apparently to be sought in the fact that the cross-linking takes place throughout the molding compound or throughout the object shaped therefrom, in a virtually simultaneous and complete manner, because if the cross-linking structure of the molecules present in the molding compound is different, or if non-cross-linked molecules are present, the above-described effect does not take place.

If the mixing of the non-cross-linked copolymer with the acid catalyst is performed in the presence of a plasticizer for the copolymer, the molding compound changes from a gel-like state to a powdered state when it is kneaded at, for example, 160° to 180°C, if catalysts of Type I are used.

The polyvinyl chloride cross-linked under these conditions appears to form with the plasticizer a coordination compound in which the plasticizer is no longer a jelling agent.

The molding compounds prepared by the process of the invention offer special advantages for the production of cross-linked types of PVC fibers which are entirely insoluble in solvents. They have improved tensile strengths, especially at higher temperatures. The filaments in this case are made preferably from solutions, with the addition of the above-mentioned mentioned catalysts of Type I in such quantities that the cross-linking does not occur until during the spinning process, or after it, e.g., during the stretching process. With the syndiotactic types the stretching can also take place prior to the cross-linking. Syndiotactic vinyl chloride-silane copolymers are crystalline, and the crystalline portions can be oriented by stretching. By the cross-linking process of the invention, the crystalline portions can then be completely fixed. Analogous statements can be made concerning the manufacture of sheets. For example, such a copolymer with the incorporated catalyst of Type I is spun as usual from a solution and the quantity of the catalyst can then be adjusted so that the fiber or sheet that has been made cross-links by itself within a few hours. No comparably simple procedure giving similar results as regards resistance to solvents and tensile strength has hitherto been possible with vinyl chloride copolymers.

Solutions of the non-cross-linked vinyl chloride-silane copolymers in ketones or tetrahydrofurans or the like, which are used in accordance with the invention are also usable to special advantage for the manufacture of PVC-base varnishes which are characterized by improved solvent resistance and improved thermal stability of shape as compared with the previously known PVC varnishes which set at room temperature. The pot life and setting conditions can be adjusted as desired by the nature and quantity of the acid catalyst of Type I that is used. The coatings made according to the invention have excellent characteristics of adhesion to metals. In this case the catalyst appears to play an important part. Especially good adhesion is achieved when hypophosphorous acid is used.

The cross-linking cannot only be controlled very precisely by the selection of the catalyst and its concentration, and by the temperatures applied, but it is also possible for it to be controlled very simply with the aid of infrared analysis. In the large-scale production of cross-linked products, especially fibers and sheets, and in the adaptation of PVC varnishes or coatings to a particular application, this, of course, if very important.

Controls of this kind have not been possible hitherto in the cross-linking of vinyl chloride polymers. The cross-linking process is characterized by a definite recession of one band in the infrared at approx. 1080 $cm^{-1}$, and by the development of a new band at approx. 1025 $cm^{-1}$. At the same time, a band occurs at 3580–3600 $cm^{-1}$, which is connected with an unassociated OH vibration of an SiOH group. This constitutes a possibility for modification which has hitherto been unknown in PVC.

Cross-linked products made according to the present invention, such as fibers and sheets, are characterized by antistatic behavior, depending on the application and the nature of the catalyst. The treatment of fibers of the present invention with antistatic agents is thus eliminated. The antistatic feature cannot be washed out.

The cross-linked products or coatings made in accordance with the present invention are characterized by structural units for the formula

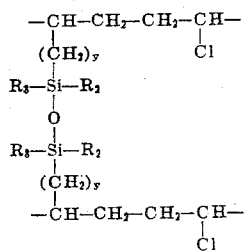

in which $y$ is 0 or 1 and $R_2$ and $R_3$ represent an alkoxy radical with one to 18 carbon atoms, an aryloxy radical of six to 12 carbon atoms, an aralkoxy radical of seven to 24 carbon atoms, alkyl radicals with one to 18 carbon atoms, aryl radicals of six to 12 carbon atoms, aralkyl radicals of seven to 24 carbon atoms, or hydroxyl groups.

EXAMPLES 1 to 12

A 15 percent solution of a copolymer of 95 weight percent vinyl chloride and 5 weight percent vinyl tripropoxysilane of a K value of 65 in tetrahydrofuran is combined with various amounts of the acid catalysts listed in Table 1. In the results shown, Hardening Time I represents the time within which plain gelification occurs, and Hardening Time II is the time at which the gel absorbs virtually no mechanical vibrations.

TABLE 1

| Example | Catalyst | Quantity, wt. percent | Hardening time, hours | Hardening time II, hours |
|---|---|---|---|---|
| 1 | Malonic acid | 0.5 | 24 | |
| 2 | | 1.0 | 24 | |
| 3 | Acetic acid | 0.5 | 24 | |
| 4 | | 1.0 | 24 | |
| 5 | Phosphoric acid | 0.5 | 9 | 50 |
| 6 | | 1.0 | 6 | 50 |
| 7 | Phosphoric acid | 0.5 | 6 | 40 |
| 8 | | 1.0 | 4 | 25 |
| 9 | Hypophosphorous acid | 0.5 | 3 | 18 |
| 10 | | 1.0 | 2 | 12 |
| 11 | p-toluenesulfonic acid | 0.5 | 1 | 8 |
| 12 | | 1.0 | 0.5 | 4 |

EXAMPLE 13

Example 9 is repeated, except that cyclohexanone is used as the solvent instead of tetrahydrofuran. In this case, Hardening Time I is 1½ hours and Hardening Time II is 8 hours, i.e., in cyclohexanone the reaction takes place more rapidly.

EXAMPLES 14 to 27

A 15 percent solution of the non-cross-linked vinyl chloride-silane copolymer used in the preceding examples was prepared in tetrahydrofuran and, after dispersing the catalyst uniformly into the solution, sheets were cast with a thickness of about 20 microns. To determine the degree of cross-linking, weighed amounts of the sheets were refluxed in trichloroethylene for eights hours and then refluxed in methanol for eight hours, and dried. The weight loss is an index of the cross-linking: the lower it is, the higher is the degree of cross-linking and the greater is the number of molecules that have taken part in the cross-linking process. The results are summarized in Table 2.

Table 2

| Example | Catalyst | Quantity in wt-% | Trichloroethylene test % of wt. loss | Temp. °C |
|---|---|---|---|---|
| 14 | None | | 38.5 | 20 |
| 15 | Phosphoric acid | 0.5 | 5.04 | 20 |
| 16 | Phosphoric acid | 0.5 | 0.0 | 100 |
| 17 | Phosphoric acid | 0.1 | 7.7 | 20 |
| 18 | Phosphoric acid | 0.1 | 0.1 | 100 |
| 19 | Hypophosphorous acid | 0.1 | 0.0 | 20 |
| 20 | " | 0.1 | 0.0 | 100 |
| 21 | Phosphoric acid | 1.0 | 0.0 | 20 |
| 22 | Benzoic acid | 1.0 | 35.0 | 20 |
| 23 | Boric acid | 1.0 | 12.8 | 20 |
| 24 | Boric acid | 0.5 | 0.0 | 100 |
| 25 | Trichloroacetic acid | 1.0 | 22.2 | 20 |
| 26 | " | 1.0 | 6.3 | 100 |
| 27 | Toluenesulfonic acid (monohydrate) | 1.0 | 0.0 | 20 |

According to the infrared analysis, too, the degree of cross-linking, i.e., the number of cross-linking points, is greatest in the Examples in which hypophosphorous acid and toluene-sulfonic acid are used.

EXAMPLES 28 to 42

48 Grams of the copolymers of 95 weight percent vinyl chloride and 5 weight percent vinyl triethoxysilane, 32 grams of phthalic acid diisooctyl ester, 1.6 grams of dibutyl tin mercaptide (Tin Stabilizer 17 M) and 240 milligrams of the catalyst listed in the table were placed in the 80 ccm cam chamber of a Brabender PLASTICORDER. The chamber was heated to 180°C and the cam roll was rotated at 27 rpm. At certain intervals of time samples were taken and the amount of cross-linking was determined by boiling in tetrahydrofuran, the insoluble material remaining undissolved.

TABLE 3

| Example | Time Min. | Percentage Cross-Linked | Catalyst |
|---|---|---|---|
| 28 | 1 | 0 | Chloroacetic acid |
| 29 | 5 | 0 | " |
| 30 | 10 | 20 | " |
| 31 | 15 | 80 | " |
| 32 | 20 | 100 | " |
| 33 | 1 | 80 | Hypophosphorous acid |
| 34 | 2 | 100 | " |
| 35 | 1 | 0 | Boric acid |
| 36 | 10 | 0 | " |
| 37 | 15 | 10 | " |
| 38 | 30 | 85 | " |
| 39 | 1 | 0 | Dicumyl peroxide |
| 40 | 5 | 0 | " |
| 41 | 20 | 40 | " |
| 42 | 30 | 100 | " |

Similar results are obtained with copolymers which contain vinyl trimethoxy, vinyl tributoxy, vinyl tri-t-botuxy, vinyl tripentoxy and vinyl trihexoxy silane. As the carbon chain lengths of the alkoxy radical increase, so do the cross-linking times.

EXAMPLES 43 to 48

Sheets 20 microns thick are cast from tetrahydrofuran solutions of copolymers of vinyl chloride with various contents of vinyl tripropoxy silane, with the addition of 0.5 percent by weight (with reference to the copolymer) of hypophosphorous acid. The sheets are then hardened in boiling water. Table 4 lists the tensile strengths at the various silane contents.

TABLE 4

| Example | % Silane | Tensile Strength at 23°C in kp/cm² | Tensile Strength at 100°C, in kp/cm |
|---|---|---|---|
| 43 | 0 | 550 | 15 |
| 44 | 1 | 510 | 30 |
| 45 | 2 | 500 | 50 |
| 46 | 3 | 490 | 65 |
| 47 | 4 | 470 | 80 |
| 48 | 5 | 450 | 105 |

What is claimed is:

1. Process for cross-linking vinyl chloride polymers which comprises mixing:

a. a non-cross-linked vinyl chloride-silane copolymer containing 30 to 99.9 weight percent vinyl chloride copolymerized with 0.1 to 20 weight percent of a silane having the formula

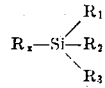

wherein
R$_x$ is selected from the group of vinyl and allyl;
R$_1$ is selected from the group of alkoxy of one to 18 carbon atoms, aryloxy of six to 12 carbon atoms, and aralkoxy of seven to 24 carbon atoms; and
R$_2$ and R$_3$ are the same as R$_1$ or are selected from the group of alkyl with one to 18 carbon atoms, aryl of six to 12 carbon atoms and aralkyl of seven to 24 carbon atoms; with b. from 0.01 to 5 percent of an acid catalyst selected from the group consisting of
  i. a room temperature catalyst from the group consisting of a phosphoric acid, a sulfonic acids and a hydrogen halide acid; and
  ii. an elevated temperature catalyst from the group consisting of a carboxylic acid, a boric acid and a compound that cleaves hydrochloric acid from the vinyl chloride copolymer from the group consisting of a peroxide, a lactone, an azo compound and an azide ; and c. heating at temperatures of from 100° to 180°C when an elevated temperature catalyst is used.

2. Process of claim 1 wherein the catalyst is hydrochloric acid generated by cleaving from the vinyl chloride copolymer by light or high-energy radiation.

3. Process of claim 1 wherein said vinyl chloride-silane copolymer is copolymerized with other monomers selected from the group of vinyl esters, fumaric esters, maleic esters, itaconic esters, vinylidene chloride, acrylonitrile, methacrylonitrile, acrylates, vinyl fluoride, and olefins.

4. Process of claim 1 wherein said copolymer contains 30 to 99.5 weight percent vinyl chloride copolymerized with 0.5 to 10 weight percent of said silane.

5. Process of claim 1 wherein the vinyl chloride-silane copolymer is syndiotactic.

6. Process of claim 1 wherein said mixing takes place in the presence of a solvent or swelling agent.

7. Process of claim 1 wherein said mixing takes place in the presence of a plasticizer for the polymer.

8. Composition comprising a uniformly cross-linked vinyl chloride-silane copolymer containing 30 to 99.9 weight percent vinyl chloride copolymerized with 0.1 to 20 weight percent silane and characterized by structural units having the formula

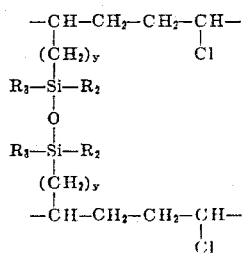

wherein R$_2$ and R$_3$ are defned in claim 14 or are hydroxyl, and $y$ is 0 or 1.

9. Composition of claim 8 wherein the vinyl chloride-silane copolymer is syndiotactic.

* * * * *